(12) United States Patent
Lunter

(10) Patent No.: US 8,406,302 B2
(45) Date of Patent: Mar. 26, 2013

(54) UNIT FOR AND METHOD OF MOTION ESTIMATION AND IMAGE PROCESSING APPARATUS PROVIDED WITH SUCH MOTION ESTIMATION UNIT

(75) Inventor: Gerard Anton Lunter, Eindhoven (NL)

(73) Assignee: Entropic Communications, Inc., San Diego, CA (US)

( * ) Notice: Subject to any disclaimer, the term of this patent is extended or adjusted under 35 U.S.C. 154(b) by 2128 days.

(21) Appl. No.: 10/483,024

(22) PCT Filed: Jun. 21, 2002

(86) PCT No.: PCT/IB02/02461
§ 371 (c)(1),
(2), (4) Date: Jan. 6, 2004

(87) PCT Pub. No.: WO03/007618
PCT Pub. Date: Jan. 23, 2003

(65) Prior Publication Data
US 2004/0190623 A1 Sep. 30, 2004

(30) Foreign Application Priority Data
Jul. 10, 2001 (EP) .................................. 01202641

(51) Int. Cl.
*H04B 1/66* (2006.01)
(52) U.S. Cl. ................................. 375/240.16
(58) Field of Classification Search ............. 375/240.16, 375/240.18, 240.17; *H04B 1/66*
See application file for complete search history.

(56) References Cited

U.S. PATENT DOCUMENTS

| 5,436,674 | A |   | 7/1995  | Hirabayashi et al. |
|-----------|---|---|---------|--------------------|
| 5,570,434 | A | * | 10/1996 | Badique ........................ 382/279 |
| 5,768,404 | A |   | 6/1998  | Morimura et al.    |
| 5,793,430 | A |   | 8/1998  | Hackett et al.     |
| 6,091,460 | A | * | 7/2000  | Hatano et al. ................. 348/699 |

(Continued)

FOREIGN PATENT DOCUMENTS

| EP | 0544681 | 7/1993 |
| EP | 0720384 | 7/1996 |

(Continued)

OTHER PUBLICATIONS

G. de Haan et al.: "True-Motion Estimation with 3-D Recursive Search Block Matching"; IEEE Transactions on circuits and system or video technology, vol. 3, No. 5, Oct. 1993, pp. 368-379.

*Primary Examiner* — Tung Vo
(74) *Attorney, Agent, or Firm* — Bruce Greenhaus; Duane Morris LLP

(57) ABSTRACT

The motion estimation unit (100) comprises a first summation means (106) for calculating match errors of a number of candidate motion vectors of a segment (116) of a first image (118). The motion vector with the lowest match error can be assigned to the segment (116) as the estimated motion vector. The match error is based on summation of absolute differences between pixel values of the segment (116) and pixel values of a second image (120). In order to estimate the deviation of the estimated motion from the true motion vector, i.e. the motion vector error (130), the motion estimation unit (100) further comprises a second summation means (108) for calculating a variance parameter by summation of absolute differences between pixel values of the segment (116) and pixel values of the first image (118) and estimation means (110) for estimating a motion vector error (130) by comparing the match error with the variance parameter.

17 Claims, 4 Drawing Sheets

U.S. PATENT DOCUMENTS

| | | | |
|---|---|---|---|
| 6,847,406 B2 * | 1/2005 | Dantwala et al. | 348/452 |
| 6,876,703 B2 * | 4/2005 | Ismaeil et al. | 375/240.16 |
| 6,925,124 B2 * | 8/2005 | Lunter et al. | 375/240.16 |
| 7,023,914 B2 * | 4/2006 | Furukawa et al. | 375/240.02 |
| 2002/0196854 A1 * | 12/2002 | Kim | 375/240.17 |

FOREIGN PATENT DOCUMENTS

| | | |
|---|---|---|
| EP | 0647919 B1 | 2/2000 |
| EP | 0886837 B1 | 7/2000 |

* cited by examiner

UNIT FOR AND METHOD OF MOTION ESTIMATION AND IMAGE PROCESSING APPARATUS PROVIDED WITH SUCH MOTION ESTIMATION UNIT

The invention relates to a motion estimation unit for generating motion vectors, each corresponding to a respective segment of a first image, comprising a first summation means for calculating a match error of a motion vector of the segment by summation of absolute differences between pixel values of the segment and pixel values of a second image.

The invention further relates to a method of generating motion vectors, each corresponding to a respective segment of a first image, comprising a first summation step of calculating a match error of a motion vector of the segment by summation of absolute differences between pixel values of the segment and pixel values of a second image.

The invention further relates to an image processing apparatus comprising:
- a motion estimation unit for generating motion vectors, each corresponding to a respective segment of a first image, comprising a first summation means for calculating a match error of a motion vector of the segment by summation of absolute differences between pixel values of the segment and pixel values of a second image; and
- a motion compensated image processing unit.

An embodiment of the method of the kind described in the opening paragraph is known from the article "True-Motion Estimation with 3-D Recursive Search Block Matching" by G. de Haan et. al. in IEEE Transactions on circuits and systems for video technology, vol. 3, no. 5, October 1993, pages 368-379.

For many applications in video signal processing, it is necessary to know the apparent velocity field of a sequence of images, known as the optical flow. This optical flow is given as a time-varying vector field, i.e., one vector field per image. In the cited article this motion vector field is estimated by dividing the image into blocks. For a set of candidate motion vectors of each block a match error is calculated and used in a minimization procedure to find the most appropriate motion vector from the set of candidate motion vectors of the block. The match error corresponds to the SAD: sum of absolute luminance differences between pixels in a block of an image, and the pixels of a block in the next image shifted by the motion vector:

$$SAD(x, y, d_x, d_y, n) := \sum_{i=0}^{N} \sum_{j=0}^{M} |Y(x+i, y+j, n) - Y(x+d_x+i, y+d_y+j, n+1)| \quad (1)$$

Here (x,y) is the position of the block, $(d_x, d_y)$ is a motion vector, n is the image number, N and M are the width and height of the block, and Y(x,y,n) is the value of the luminance of a pixel at position (x,y) in image n.

The estimated motion vector may deviate from the true motion vector, i.e. there may be a motion vector error. The value of SAD can only be used in comparisons, as a relative measure. The calculated SAD does not give a reliable indication of the accuracy of the motion vector, i.e. the motion vector error. This is a drawback of the method according to the prior art.

It is a first object of the invention to provide a motion estimation unit of the kind described in the opening paragraph which is arranged to calculate a motion vector error.

It is a second object of the invention to provide a method of the kind described in the opening paragraph in which a motion vector error is calculated.

It is a third object of the invention to provide an image processing apparatus of the kind described in the opening paragraph which is arranged to calculate a motion vector error.

The first object of the invention is achieved in that the motion estimation unit further comprises:
- a second summation means for calculating a variance parameter by summation of absolute differences between pixel values of the segment and pixel values of the first image; and
- an estimation means for estimating a motion vector error by comparing the match error with the variance parameter.

With the second summation means a variance parameter can be calculated which is a measure of the level of detail in the block. A block is a type of segment. Motion estimation for irregular shaped segments is also quite common. The invention is also applicable to irregular shaped segments. If there is much detail in the block, i.e. resulting in a relatively high value of the variance parameter, then the value of the match error can have a relatively high value too. A relatively low value of the variance parameter in combination with a relatively high value of the match error indicates that the estimated motion vector might be erroneous.

It is an advantage of the motion estimation unit according to the invention that the motion estimation unit provides a motion vector error, because there are applications where one is interested in the value of the motion vector error. For instance, when the motion vector is good enough, it is unnecessary to spend time on trying to improve it. Efficiency and vector field consistency are thereby improved. A motion vector error can also be useful for estimating the global quality of the motion vector field, to decide when to use fall-back options, or more sophisticated algorithms that generate fewer artifacts. It can also be used to find blocks that have an overlap with object edges, which can then be handled in a more suitable way.

A related idea has been proposed in EP 0 549 681 B2 in which a motion estimator unit is described which operates on at least four images to determine a motion vector. In that patent specification it is proposed to estimate motion vectors by minimization of assignment errors which are calculated by dividing a difference between values of pixels of subsequent images by a so-called gradient. This gradient is calculated by taking the square root of quadratic differences. The following major differences between the motion estimation unit according to the invention and the motion estimation unit described in EP 0 549 681 B2 are:

The variance parameter and the match error of the motion estimation unit according to the invention are based on an equivalent measure: a sum of absolute differences. In the motion estimation unit described in EP 0 549 681 B2 two different measures are calculated: a differences and a square root of quadratic differences. An advantages of using twice a sum of absolute differences is that the motion vector error can provide qualitative and even quantitative information about the deviation of the estimated motion vector from the true motion vector. Experiments to prove this have been performed. The results of these experiments are described hereinafter in connection with the FIG. 3 to FIG. 7. Another advantages of using twice a sum of absolute differences is that it is less computation intensive.

The variance parameter might be used in the motion estimation unit according to the invention for normalization of the match errors of all candidate motion vectors. However this is not necessary because the variance parameter is a constant for all candidate motion vectors of a segment. It is sufficient if only for the estimated motion vector, i.e. one out of the set of candidate motion vectors, the motion vector error is calculated in order to determine whether the estimated motion vector might be an appropriate value of the true motion. In the motion estimation unit described in EP 0 549 681 B2 a normalization is performed for all candidate motion vectors.

In an embodiment of the motion estimation unit according to the invention, the second summation means is designed to calculate the variance parameter by adding:

absolute differences between pixel values of the segment and pixel values of a second segment which corresponds to the segment being shifted at least one pixel in a first direction; and absolute differences between pixel values of the segment and pixel values of a third segment which corresponds to the segment being shifted at least one pixel in a second direction, the first direction being cross to the second direction.

The purpose of the variance parameter measure is to predict the sum of absolute differences resulting from a known motion vector deviation. Since the true motion vector is not known, a segment is matched against the slightly displaced, i.e. shifted, segment in the same image. As the direction of the error is not known, an average over two directions is made. In other words, by comparing two measures, i.e. the match error with the variance parameter, which are both a measure of a translation, it is possible to derive the motion vector error which is related to the difference between the estimated motion vector, and the true motion vector. The match error is based on a translation of a block between subsequent images, and the variance parameter is based on translation of a block within one image. The value of the shift applied to the block for calculating the variance parameter is stochastically related to the variance parameter. The probability that, if the shift applied to the block for calculating the variance parameter is increased, the variance parameter will increase too, is relatively large. With the help of the variance parameter, a statement can be made regarding the distribution of the match error values as a function of the motion vector error.

In a modification of the embodiment of the motion estimation unit according to the invention, the second summation means is designed to add also absolute differences between pixel values of the segment and pixel values of a fourth segment which corresponds to the segment being shifted at least one pixel in the first direction and at least one pixel in the second direction. The advantage of this embodiment is that also directions which are diagonal on the first and second direction are taken into account when the motion estimation unit is in operation.

An embodiment of the motion estimation unit according to the invention is designed to generate the motion vector of the segment being a block of pixels. An advantage of a motion estimation unit based on blocks of pixels is its simplicity of design. Another embodiment of the motion estimation unit according to the invention is designed to handle irregularly shaped segments.

An embodiment of the motion estimation unit according to the invention is designed to generate the motion vector of the segment based on luminance values as pixel values. Luminance is an appropriate quantity for motion estimation. Another embodiment of the motion estimation unit according to the invention is designed to operate on chrominance values.

The second object of the invention is achieved in that the method further comprises:

a second summation step of calculating a variance parameter by summation of absolute differences between pixel values of the segment and pixel values of the first image; and an estimation step of estimating a motion vector error by comparing the match error with the variance parameter.

The third object of the invention is achieved in that the motion estimation unit of the image processing apparatus further comprises:

a second summation means for calculating a variance parameter by summation of absolute differences between pixel values of the segment and pixel values of the first image; and an estimation means for estimating a motion vector error by comparing the match error with the variance parameter.

Modifications of the image processing apparatus and variations thereof may correspond to modifications and variations thereof of the motion estimator unit described. The image processing apparatus may comprise additional components, e.g. receiving means for receiving a signal representing images and a display device for displaying the processed images. The motion compensated image processing unit might support one or more of the following types of image processing:

De-interlacing: Interlacing is the common video broadcast procedure for transmitting the odd or even numbered image lines alternately. De-interlacing attempts to restore the full vertical resolution, i.e. make odd and even lines available simultaneously for each image;

Up-conversion: From a series of original input images a larger series of output images is calculated. Output images are temporally located between two original input images; and Temporal noise reduction.

These and other aspects of the motion estimation unit, of the method and of the image processing apparatus according to the invention will become apparent from and will be elucidated with respect to the implementations and embodiments described hereinafter and with reference to the accompanying drawings, wherein:

FIG. 1 schematically shows an embodiment of the motion estimation unit;

FIG. 2 schematically shows an embodiment of the image processing apparatus;

Figure 1:
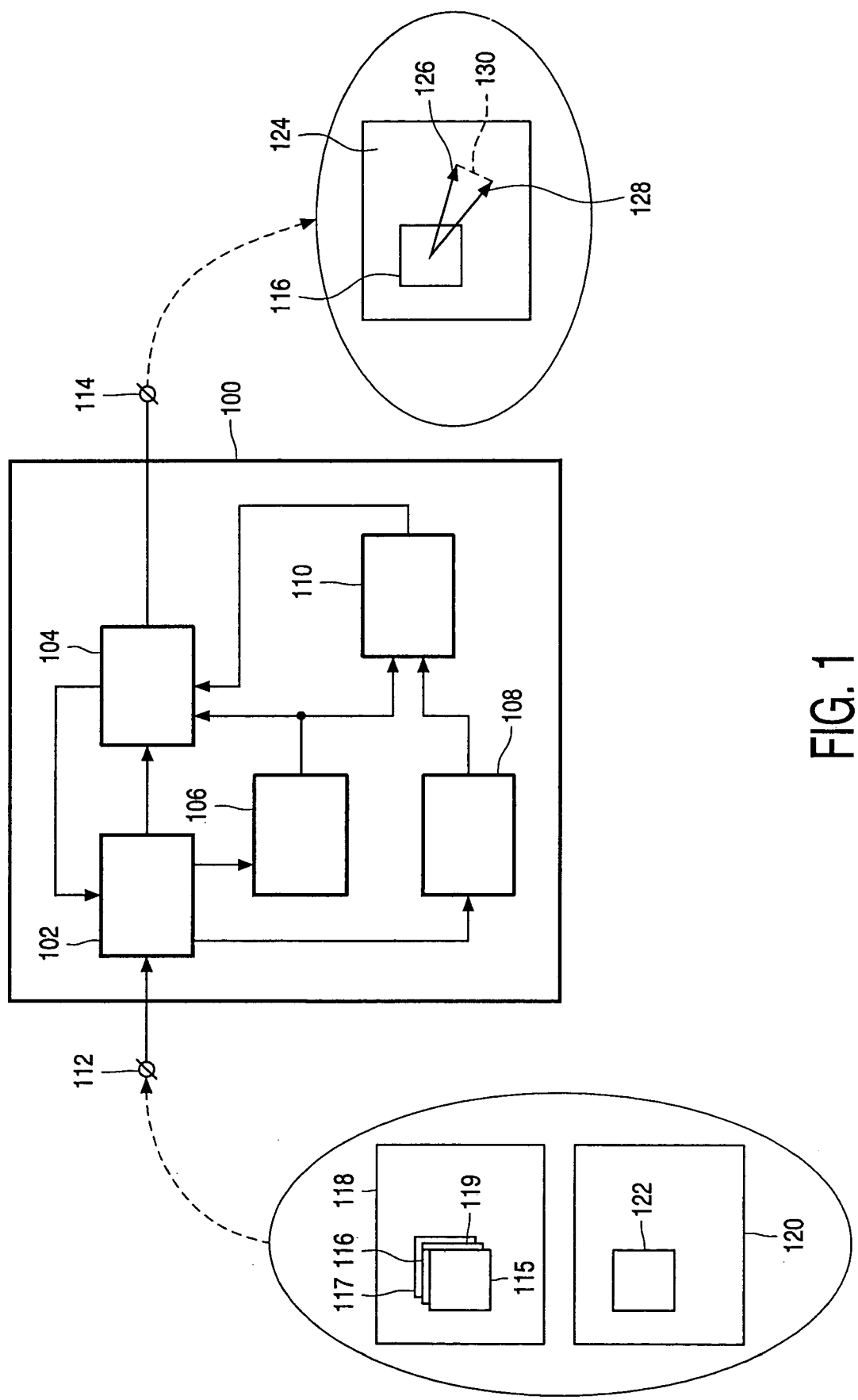
FIG. 1 schematically shows an embodiment of the motion estimation unit 100, comprising.

a generating means 102 for generating a set of candidate motion vectors of a segment 116 of a first image 118;

a first summation means 106 for calculating match errors of candidate motion vectors of segment 116 by summation of absolute differences between pixel values of the segment 116 and pixel values of a second image 120;

a second summation means 108 for calculating a variance parameter by summation of absolute differences between pixel values of the segment 116 and pixel values of the first image 118;

an estimation means 110 for estimating a motion vector error 130 by comparing a particular match error with the variance parameter; and a selecting means 104 for selecting a particular motion vector 126 from the set of candidate motion vectors on the basis of the match errors.

The input of the motion estimator unit 100 comprises images and is provided at an input connector 112. The output of the motion estimator unit 100 are motion vector fields, e.g. 124 comprising motion vectors of the segments, e.g. 116. The output of the motion estimator unit 100 is provided at an output connector 114. The behavior of the motion estimator unit 100 is as follows. First the generating means 102 generates for a segment 116, e.g. block of pixels, a set of candidate motion vectors. Then the first summation means 106 calculates for these candidate motion vectors the match errors. Then the selecting means 104 selects a particular motion vector 126 from the set of candidate motion vectors on the basis of these match errors. This particular motion vector 126 is selected because its match error has the lowest value. The second summation means 108 calculates the variance parameter of the segment 116. For the particular motion vector 126 and optionally for some other motion vectors of the candidate set the motion vector errors, e.g. 130, are calculated based on the match errors and the variance parameter. A motion vector error, e.g. 130 corresponds to the length of the difference vector between the true motion vector 128 and the motion vector 126 used in calculating the match error. These motion vector errors, e.g. 130 are input for the selecting means 104. If the value of the motion vector error 130 of the particular motion vector 126 is less than a predetermined threshold then the particular motion vector 126 is assigned to the segment 116. The selecting means 104 is arranged to trigger the generating means 102 to generate a new set of candidate motion vectors if the value of the motion vector error 130 of the particular motion vector 126 is higher then the predetermined threshold. The selecting means 104 is informed by the estimation means 110 whether the motion vectors for which the motion vector errors have been calculated too, might be appropriate candidates for other segments.

The match error being calculated by the first summation means 106 corresponds to the SAD: sum of absolute luminance differences between pixels in a particular block of an image, and the pixels of a block in the next image corresponding to the particular block shifted by the motion vector:

$$SAD(x,y,d_x,d_y,n):=$$

$$SAD(x, y, d_x, d_y, n) := \sum_{i=0}^{N} \sum_{j=0}^{M} |Y(x+i, y+j, n) - Y(x+d_x+i, y+d_y+j, n+1)| \quad (1)$$

Here (x, y) is the position of the block, $(d_x, d_y)$ is a motion vector, n is the image number, N and M are the width and height of the block, and Y(x,y,n) is the value of the luminance of a pixel at position (x,y) in image n.

The variance parameter calculated by the second summation means 108 corresponds to the VAR: sum of absolute luminance differences between pixels in a particular block of an image, and the pixels of a block in the same image but shifted a predetermined amount of pixels. In order to define the variance parameter, the function DIFF is introduced.

$$DIFF(x_1, y_1, x_2, y_2, n_1, n_2) := \sum_{i=0}^{N} \sum_{j=0}^{M} |Y(x_1+i, y_1+j, n_1) - Y(x_2+i, y_2+j, n_2)| \quad (2)$$

where again N and M are the width and height of the block. In terms of this function, i.e. substitution of Equation (2) in Equation (1), the SAD becomes:

$$SAD(x,y,d_x,d_y,n):=DIFF(x,y,x+d_x,y+d_y,n,n+1) \quad (3)$$

The variance parameter VAR can be defined as follows:

$$VAR(x,y):=\tfrac{1}{2}(DIFF(x,y,x+1,y,n,n)+DIFF(x,y,x,y+1,n,n)) \quad (4)$$

This gives an expectation of the match error SAD for a motion vector error of 1 pixel. In this case the variance parameter is based on the average over two different directions.

Another way to calculate a variance parameter is by taking into account diagonal directions too:

$$VAR4(x, y) := \frac{1}{4} \begin{pmatrix} DIFF(x, y, x+1, y, n, n) + \\ DIFF(x, y, x, y+1, n, n) + \\ DIFF(x, y, x+1, y+1, n, n)/\sqrt{2} + \\ DIFF(x, y, x+1, y+1, n, n)/\sqrt{2} \end{pmatrix} \quad (5)$$

Another way to calculate a variance parameter is by using larger shifts, e.g. 2 pixels:

$$VAR2(x, y) := \frac{1}{2} \begin{pmatrix} \frac{1}{2} DIFF(x, y, x+2, y, n, n) + \\ \frac{1}{2} DIFF(x, y, x, y+2, n, n) \end{pmatrix} \quad (6)$$

The size of the shift is related to the block size. The VAR4 measure is twice as expensive as the others. The VAR2 measure is less sensitive to noise than VAR.

Figure 2:
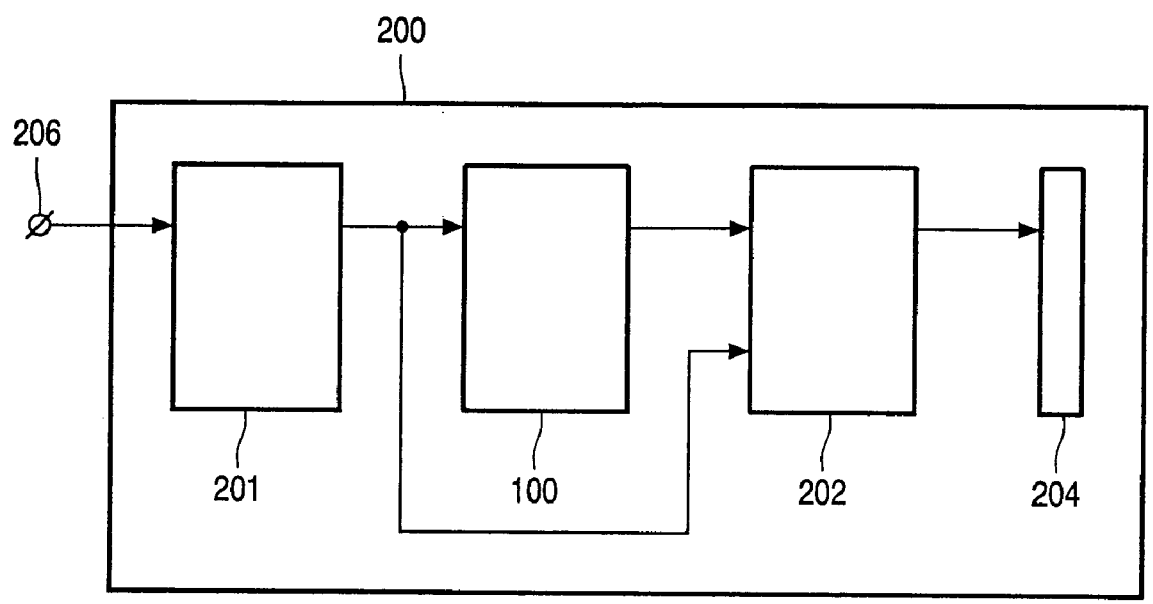

FIG. 2 schematically shows elements of an image processing apparatus 200 comprising:

receiving means 201 for receiving a signal representing images to be displayed after some processing has been performed. The signal may be a broadcast signal received via an antenna or cable but may also be a signal from a storage device like a VCR (Video Cassette Recorder) or Digital Versatile Disk (DVD). The signal is provided at the input connector 206.

a motion estimator unit 100 as described in connection with FIG. 1;

a motion compensated image processing unit 202; and a display device 204 or displaying the processed images.

The motion compensated image processing unit 202 optionally supports one or more of the following types of image processing:

De-interlacing: Interlacing is the common video broadcast procedure for transmitting the odd or even numbered image lines alternately. De-interlacing attempts to restore the full vertical resolution, i.e. make odd and even lines available simultaneously for each image;

Up-conversion: From a series of original input images a larger series of output images is calculated. Output images are temporally located between two original input images; and Temporal noise reduction.

The motion compensated image processing unit 202 requires images and motion vectors as its input.

Experiments have been carried out to investigate the relation between the variance parameter VAR, the match error SAD, and the motion vector error VE. Based on these experiments hypotheses are adopted regarding these relations. First VE and VAR were taken as independent variables, and SAD as dependent variable. Second SAD and VAR were taken as independent variables and VE as dependent variable. This latter relation is of most relevance. It enables to qualify a motion vector and even to quantify the motion vector error to certain extent. The result is that an estimated motion vector can be categorized as follows:

The estimated motion vector is substantially equal to the true motion vector: SAD<a*VAR with a predetermined small number.

The estimated motion vector deviates approximately e pixels from the true motion vector, i.e. the size of the motion vector error approximately equals e pixels. This can only be indicated for a range of values of motion vector errors, e.g. $0 \leq e \leq 3$ pixels: SAD>b, (⅗)SAD/VAR<e [pixels] with b some predetermined small threshold.

The estimated motion vector is substantially unequal to the true motion vector: SAD>b, (⅗)SAD>3*VAR.

The difference between the estimated motion vector and the true motion vector is unknown: remaining cases.

Figure 3:
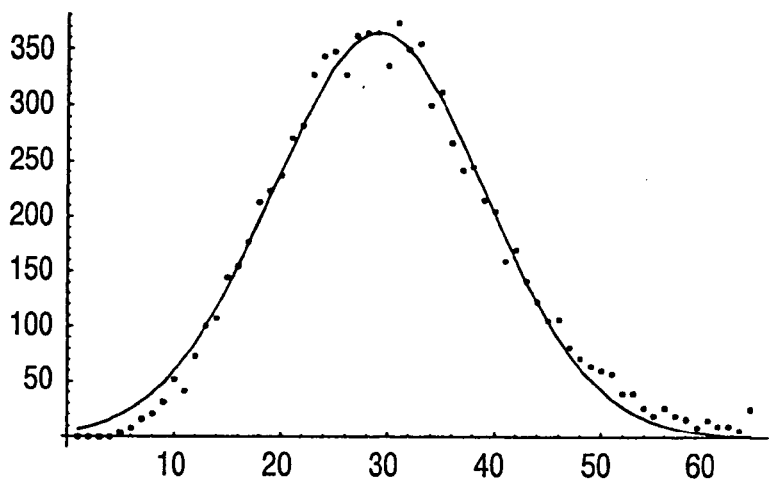
FIG. 3 shows a histogram of SAD values for a test sequence used in the experiments for fixed VAR of 1500, and VE of 1 pixel, together with best Gaussian fit.

The set-up of the experiments was as follows. For a number of sequences of images with simple motion, i.e. no or few occlusions, the 3DRS motion estimator of the prior art was used to converge to high precision, i.e. 0.25 pixel. To obtain sub-pixel accuracy bilinear interpolation was used. The estimated motion vectors corresponded with the "true" motion vectors. Then the "true" vectors were displaced by a fixed amount in arbitrary directions. In other words the "true" motion vectors were adapted with the motion vector error. The values of SAD corresponding to the resulting motion vectors were then put in a 2D-histogram against the value of VAR. It turned out, experimentally, that for fixed VE and VAR, the distribution of the SAD values could be well approximated by a Gaussian distribution. This seemed to hold for arbitrary VAR, and for VE in the range of 0 to about 3 pixels. A block size of N=M=8 pixels was used. FIG. 3 shows a histogram of SAD values for a test sequence used in the experiments for fixed VAR of 1500, and VE of 1 pixel, together with best Gaussian fit. Based on the experimental results the hypothesis is adopted that for fixed VE and VAR, the distribution of the SAD values is well approximated by a Gaussian distribution:

$$SAD \approx \aleph \; (\mu(VAR,VE), \sigma(VAR,VE)) \quad (7)$$

with the probability density function given by $$A \exp(-(x-\mu)^2/2\sigma^2) \quad (8)$$

Figure 4A:
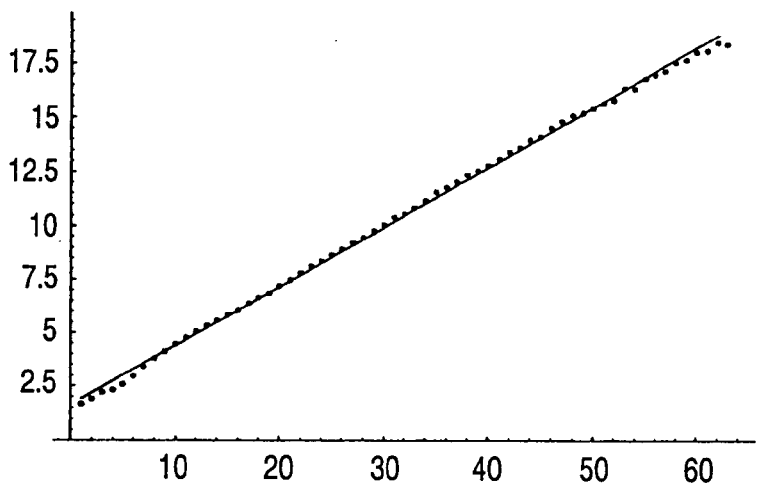
FIG. 4A shows the dependence of $\mu$ as function of VAR for VE=0, for a test sequence.
Figure 4B:
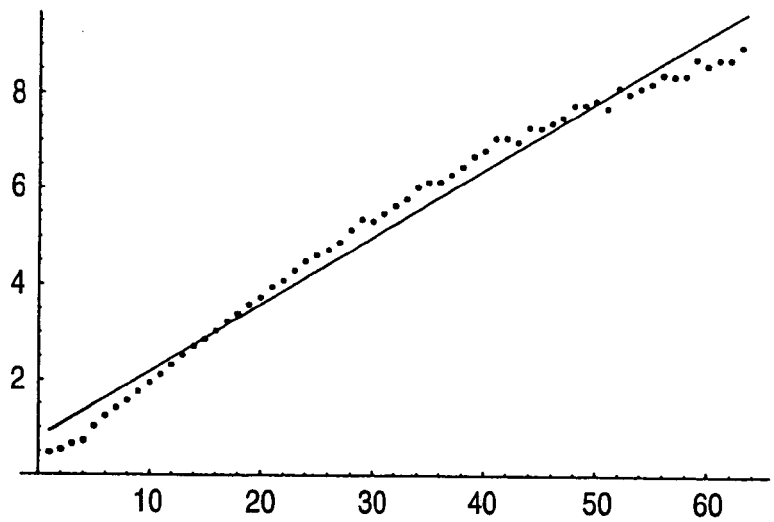
FIG. 4B shows the dependence of $\sigma$ as function of VAR for VE=0, for a test sequence.
Figure 5A:
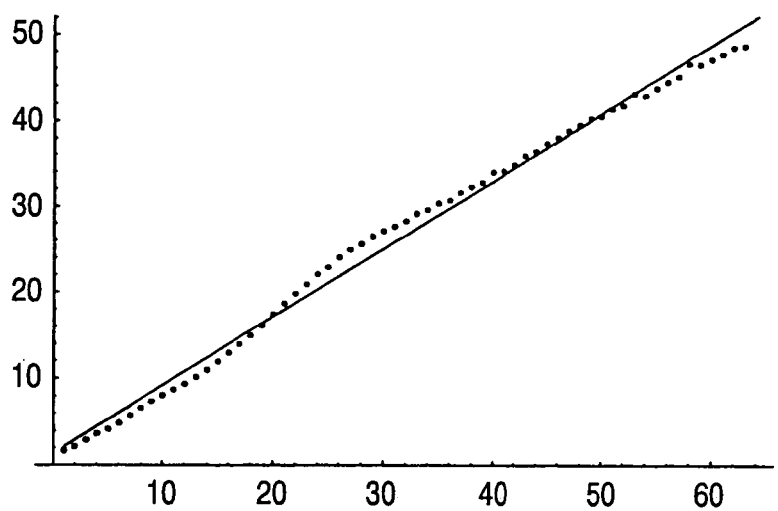
FIG. 5A shows the dependence of $\mu$ as function of VAR for VE=1, for a test sequence.
Figure 5B:
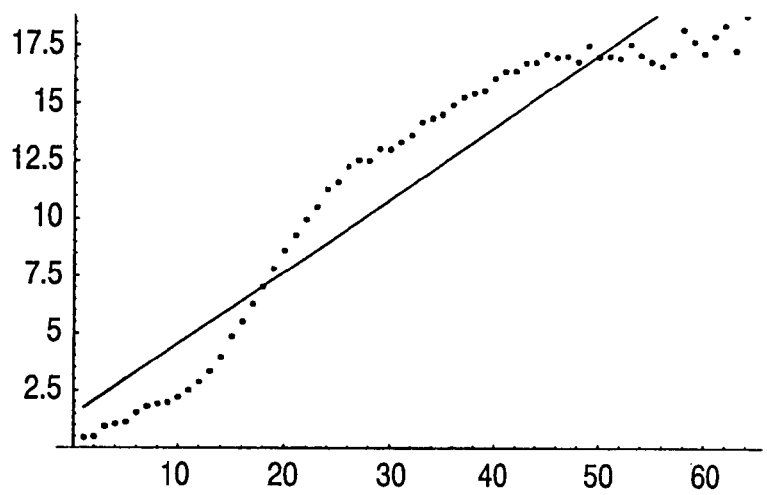
FIG. 5B shows the dependence of $\sigma$ as function of VAR for VE=1, for a test sequence.

The dependence of μ and σ on VAR and VE was analyzed by least square fitting 1D slices of the 2D histogram to Gaussian curves. The constants of proportionality of the linear dependence of μ and σ on VAR, clearly depend on VE. These constants were estimated for VE=0, 0.5, 1, 1.5, 2 and 3 pixels. It appeared that, in the range $0 \leq VE \leq 3$ pixels, the dependence of μ as function of VAR is very nicely linear, whereas the dependence of σ on VAR starts deviating from a linear dependence when VE becomes larger. A linear dependence still seems a reasonable approximation up to about VE=3 pixels. For VE=0, the resulting measurements as a function of VAR have been plot in FIG. 4A and FIG. 4B. FIG. 4A shows the dependence of μ as function of VAR for VE=0, for a test sequence and FIG. 4B shows the dependence of σ as function of VAR for VE=0, for a test sequence. Note that the lines do not pass through the origin, corresponding to a residual SAD, even for VE=0. There are several reasons for this: vector errors in the "true" motion field, the 0.25 pixel vector accuracy and sub-pixel interpolation errors, to name three. FIG. 5A shows the dependence of μ as function of VAR for VE=1, for a test sequence and FIG. 5B shows the dependence of σ as function of VAR for VE=1, for a test sequence.

Figure 6:
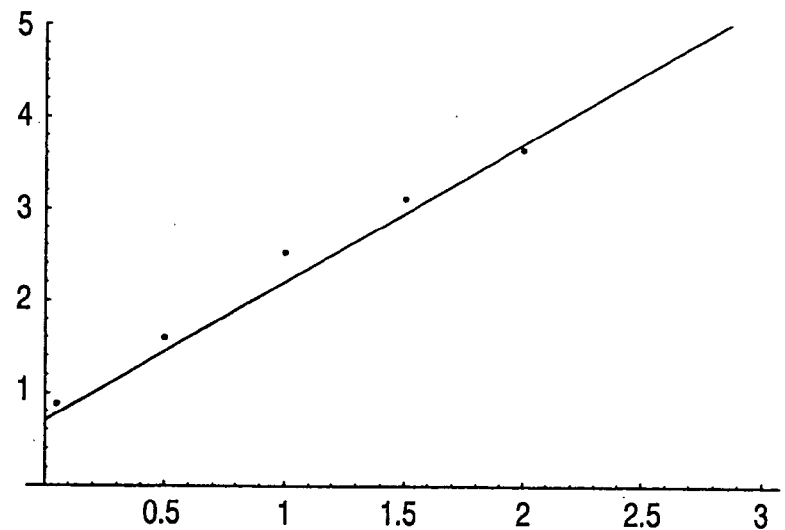
FIG. 6 shows the dependence of constant $\alpha$ in SAD≈ $\aleph$ ($\alpha$VAR,$\alpha$VAR,3.0) on VE, for a test sequence.

In FIG. 6 the dependence of the constant of proportionality α in μ=αVAR on VE is shown. This dependence on VE is roughly linear in the range $0 \leq VE \leq 3$ pixels. A least square fit yields:

$$\mu = (0.7 + 1.5VE)VAR \quad (9)$$

$$\sigma = (0.2 + 0.5VE)VAR \quad (10)$$

This can be simplified to σ=μ/3.

Hence, a conditional probability distribution of SAD values given VE and VAR has been derived. Given VAR and VE, the SAD is distributed according to the probability distribution $$P(SAD = x \mid VE = e, VAR = v) = \frac{1}{\sqrt{2\pi}\,\sigma_{e,v}} \exp(-(x-\mu_{e,v})^2/2\sigma_{e,v}^2) \quad (11)$$

where $\mu_{e,v} = (0.7 + 1.5e)v$ and $\sigma_{e,v} = \mu_{e,v}/3.0$.

Above it is described how the SAD depends on the independent variables VE and VAR. In a motion estimation unit according to the invention SAD and VAR can be calculated directly. Next it will be described how VE can be estimated based on SAD and VAR. Using Bayes' rule, the probability distribution of VE given SAD and VAR can be computed:

$$P(VE = e \mid SAD = x, VAR = v) = \qquad (12)$$
$$\frac{P(SAD = x \mid VE = e, VAR = v)P(VE = e \mid VAR = v)}{P(SAD = x \mid VAR = v)}$$

Since nothing is known of the prior on the VE distribution, a uniform distribution is chosen. The relevant range of pixels is from 0 to 3 pixels, so P(VE=e|VAR=v)=⅓ if $0 \leq e \leq 3$ and 0 otherwise. The results of the experiments indicated that the expected SAD scales linearly with VAR. Since nothing else is known of the prior, it is chosen P(SAD=x|VAR=v)=1/cv if $0 \leq x \leq cv$, and 0 otherwise, where c is an arbitrary relatively large scaling factor. This yields to:

$$P(VE = e \mid SAD = x, VAR = v) = \frac{c}{3}\frac{v}{\sqrt{2\pi}\,\sigma_{e,v}} \exp(-(x-\mu_{e,v})^2/2\sigma_{e,v}^2) \quad (13)$$

The expectation value E (VE) and standard deviation SD (VE) of VE according to these distributions is shown in Table 1.

TABLE 1

| SAD/VAR | 0.5 | 1.0 | 2.0 | 3.0 | 4.0 | 5.0 |
|---|---|---|---|---|---|---|
| E(VE) | 0.4 | 0.5 | 1.2 | 1.9 | 2.5 | 3.0 |
| SD(VE) | 0.6 | 0.6 | 0.7 | 0.7 | 0.7 | 0.7 |

Across a useful range these results can be summarized by $$E(VE) \approx \frac{3}{5} \frac{SAD}{VAR} \quad (14)$$

$$SD(VE) \approx 0.7 \quad (15)$$

With Equation (14) the expected value of a motion vector error can be estimated if the values of the variance parameter VAR and the match error SAD are known. Equation (14) holds for the ranges as indicated in Table 1. Note that in practice one would add a small number to VAR to make Equation (14) less sensitive to noise, and to avoid division by zero. The analysis sketched above has also been carried out for the measures VAR4 and VAR2 mentioned above. The results were very similar.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprises several distinct elements and by means of a suitable programmed computer. In the unit claims enumerating several means, several of these means can be embodied by one and the same item of hardware.

The invention claimed is:

1. A motion estimation unit that generates motion vectors, each of the motion vectors corresponding to a respective segment of a first image, the motion estimation unit comprising:
   a first summer that calculates a match error of the motion vector of the respective segment by summation of absolute differences between pixel values of the respective segment and pixel values of a second image;
   a second summer that calculates a variance parameter by summation of absolute differences between pixel values of the respective segment and pixel values of the first image; and
   an estimator that estimates a motion vector error by comparing the match error with the variance parameter, said motion vector error being used to assess a quality of the motion vector, wherein an expectation value of the motion vector error is proportional to the match error divided by the variance parameter, wherein the expectation value of the motion vector error is approximately ⅗ of the match error divided by the variance parameter.

2. The motion estimation unit of claim 1, wherein the second summer calculates the variance parameter by adding:
   absolute differences between pixel values of the respective segment and pixel values of a second segment which corresponds to the respective segment being shifted at least one pixel in a first direction; and
   absolute differences between pixel values of the respective segment and pixel values of a third segment which corresponds to the respective segment being shifted at least one pixel in a second direction, the first direction being cross to the second direction.

3. The motion estimation unit of claim 2, wherein the second summer adds absolute differences between pixel values of the respective segment and pixel values of a fourth segment which corresponds to the respective segment being shifted at least one pixel in the first direction and at least one pixel in the second direction.

4. The motion estimation unit of claim 1, characterized in generating the motion vector of the respective segment, the respective segment being a block of pixels.

5. The motion estimation unit of claim 1, characterized in generating the motion vector of the respective segment based on luminance values as pixel values.

6. A method of generating motion vectors, each of the motion vectors corresponding to a respective segment of a first image, the method comprising:
   calculating a match error of a motion vector of the respective segment by summation of absolute differences between pixel values of the respective segment and pixel values of a second image;
   calculating a variance parameter by summation of absolute differences between pixel values of the respective segment and pixel values of the first image;
   estimating a motion vector error by comparing the match error with the variance parameter; and
   determining a quality of the motion vector based on the motion vector error, wherein an expectation value of the motion vector error is proportional to the match error divided by the variance parameter, wherein the expectation value of the motion vector error is approximately ⅗ of the match error divided by the variance parameter.

7. The method of claim 6, wherein the variance parameter is calculated by adding:
   absolute differences between pixel values of the respective segment and pixel values of a second segment which corresponds to the respective segment being shifted at least one pixel in a first direction; and
   absolute differences between pixel values of the respective segment and pixel values of a third segment which corresponds to the respective segment being shifted at least one pixel in a second direction, with the first direction cross to the second direction.

8. The method of claim 7, further comprising:
   adding absolute differences between pixel values of the respective segment and pixel values of a fourth segment which corresponds to the respective segment being shifted at least one pixel in the first direction and at least one pixel in the second direction.

9. An image processing apparatus comprising:
   a motion estimation unit that generates motion vectors, each of the motion vectors corresponding to a respective segment of a first image, the motion estimation unit comprising:
   a first summer that calculates a match error of a motion vector of the respective segment by summation of absolute differences between pixel values of the respective segment and pixel values of a second image; and
   a second summer that calculates a variance parameter by summation of absolute differences between pixel values of the respective segment and pixel values of the first image; and
   an estimator that estimates a motion vector error by comparing the match error with the variance parameter, said motion vector error being used to assess a quality of the motion vector, wherein an expectation value of the motion vector error is proportional to the match error divided by the variance parameter, wherein the expectation value of the motion vector error is approximately ⅗ of the match error divided by the variance parameter.

10. The image processing apparatus of claim 9, wherein the motion compensated image processing unit reduces noise in the first image.

11. The image processing apparatus of claim 9, wherein the motion compensated image processing unit de-interlaces the first image.

12. The image processing apparatus of claim 9, wherein the motion compensated image processing unit performs an up-conversion.

13. The motion estimation unit of claim 1, wherein the motion vector error is used to detect object edges.

14. The method of claim 8, further comprising:
    detecting object edges based on the motion vector error.

15. The motion estimation unit of claim 1, wherein a standard deviation of the motion vector error is approximately 7/10.

16. The method of claim 6, wherein a standard deviation of the motion vector error is approximately 7/10.

17. The image processing apparatus of claim 9, wherein a standard deviation of the motion vector error is approximately 7/10.

* * * * *